US007913295B2

(12) United States Patent
Myers et al.

(10) Patent No.: US 7,913,295 B2
(45) Date of Patent: Mar. 22, 2011

(54) METHOD AND APPARATUS TO ENABLE A SECURELY PROVISIONED COMPUTING ENVIRONMENT

(75) Inventors: Mark Myers, Fall City, WA (US); William J. Westerinen, Issaquah, WA (US); Todd L. Carpenter, Monroe, WA (US); Shaun Wiley, Seattle, WA (US); Don Hyun, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1021 days.

(21) Appl. No.: 11/696,351

(22) Filed: Apr. 4, 2007

(65) Prior Publication Data

US 2008/0250476 A1    Oct. 9, 2008

(51) Int. Cl.
G06F 21/22    (2006.01)
H04L 9/32    (2006.01)
H04N 7/16    (2006.01)
(52) U.S. Cl. .............................. 726/4; 705/51; 380/231
(58) Field of Classification Search ................. 380/256, 380/231; 705/55
See application file for complete search history.

(56) References Cited

U.S. PATENT DOCUMENTS

| | | | | |
|---|---|---|---|---|
| 5,764,762 A * | 6/1998 | Kazmierczak et al. | ......... | 705/52 |
| 5,870,726 A * | 2/1999 | Lorphelin | .................... | 705/400 |
| 6,862,684 B1 * | 3/2005 | DiGiorgio | .................... | 713/163 |
| 6,920,553 B1 | 7/2005 | Poisner | | |
| 6,920,557 B2 | 7/2005 | Coffy et al. | | |
| 6,986,036 B2 | 1/2006 | Wang et al. | | |
| 7,043,587 B2 | 5/2006 | Burke et al. | | |
| 2002/0007347 A1 * | 1/2002 | Blumenthal et al. | ............ | 705/51 |
| 2003/0221112 A1 | 11/2003 | Ellis et al. | | |
| 2005/0193188 A1 | 9/2005 | Huang | | |
| 2005/0198485 A1 | 9/2005 | Nguyen et al. | | |
| 2006/0064577 A1 | 3/2006 | Chiu et al. | | |
| 2006/0107119 A1 | 5/2006 | Miller et al. | | |
| 2006/0112384 A1 | 5/2006 | Frank et al. | | |
| 2006/0168389 A1 | 7/2006 | Bentley | | |

(Continued)

FOREIGN PATENT DOCUMENTS

KR    20020013241 A    2/2002

(Continued)

OTHER PUBLICATIONS

Blundo et al., "SAWM: A Tool for Secure and Authenticated Web Metering", Jul. 15-19, 2002, ACM, pp. 641-648.*

(Continued)

Primary Examiner — Matthew B Smithers
(74) Attorney, Agent, or Firm — Marshall, Gerstein & Borun LLP (57) ABSTRACT

A form of removable memory, such as a universal serial bus (USB) flash device, may enable a subscription-based computing system from any PC. The device may include an execution unit including a processor, a private memory including an encrypted application, a computing system interface, a cryptographic unit including a secure storage with a number of metering units, and a computer-readable medium. The computer-readable medium may include instructions for routing messages and data from the execution unit through the computing system interface to a connected computing system. Further, encrypted application data may be routed through the cryptographic unit to the execution unit to thereby transform the encrypted application into executable data for use by the computing system. Also, the device may decrement a number of metering units stored at the device during execution of the encrypted application by the computer.

17 Claims, 5 Drawing Sheets

U.S. PATENT DOCUMENTS

2006/0282899 A1   12/2006   Raciborski

FOREIGN PATENT DOCUMENTS

KR   20050022448 A   3/2005

OTHER PUBLICATIONS

Written Opinion for PCT/US2008/059248 mailed Mar. 26, 2009.

International Search Report for PCT/US2008/059248 mailed Mar. 26, 2009.

Microsoft Tests 'pay as you go' Computers http://msl1.mit.edu/furdlog/docs/latimes/2006-05-22_latimes_ms_computer.pdf.

The Technology behind Microsoft FlexGo http://www.microsoft.com/whdc/flexgo/tech.mspx, Feb. 12, 2007.

AMD to resell Transmeta chip for pay-as-you-go PC's http://www.infoworld.com/article/06/06/05/78693_HNamdtransmeta_1.html.

* cited by examiner

METHOD AND APPARATUS TO ENABLE A SECURELY PROVISIONED COMPUTING ENVIRONMENT

BACKGROUND

This Background is intended to provide the basic context of this patent application and is not intended to describe a specific problem to be solved.

Pay-as-you-go or pay-per-use business models have been used in many areas of commerce, from cellular telephones to commercial launderettes. In developing a pay-as-you go business, a provider, for example, a cellular telephone provider, offers the use of hardware (a cellular telephone) at a lower-than-market cost in exchange for a commitment to remain a subscriber to their network. In this specific example, the customer receives a cellular phone for little or no money in exchange for signing a contract to become a subscriber for a given period of time. Over the course of the contract, the service provider recovers the cost of the hardware by charging the consumer for using the cellular phone.

The pay-as-you-go business model is predicated on the concept that the hardware provided has little or no value, or use, if disconnected from the service provider. To illustrate, should the subscriber mentioned above cease to pay his or her bill, the service provider deactivates their account, and while the cellular telephone may power up, calls cannot be made because the service provider will not allow them. The deactivated phone has no "salvage" value, because the phone will not work elsewhere and the component parts are not easily salvaged nor do they have a significant street value. When the account is brought current, the service provider will reconnect the device to network and allow making calls.

This model works well when the service provider, or other entity taking the financial risk of providing subsidized hardware, has a tight control on the use of the hardware and when the device has little salvage value. This business model does not work well when the hardware has substantial uses outside the service provider's span of control. Thus, a typical personal computer does not meet these criteria since a personal computer may have substantial uses beyond an original intent. Further, the components of a personal computer, e.g. a display or disk drive, may have a significant salvage value.

In a typical pay-as-you-go computing business model, a user purchases a code that is redeemable for a number of computing hours at a specially-equipped electronic device. The user may add time to an existing account balance by purchasing additional codes. However, to ensure security of the user's time balance, to securely track consumed time, and to prevent illicit use of metered applications, all associated time and applications are stored at the machine itself and cannot be transferred to other machines. Storing the user's time balance and metered application on one machine prevents the user from accessing computer services at any machine other than the device containing the account balance and applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A form of removable memory, such as a universal serial bus (USB) flash device, may enable a subscription-based computing system from any PC. The device may include an execution unit including a processor, a private memory including an encrypted application, a computing system interface, a cryptographic unit including a secure storage with a number of metering units, and a computer-readable medium. The computer-readable medium may include instructions for routing messages and data from the execution unit through the computing system interface to a connected computing system. Further, encrypted application data may be routed through the cryptographic unit to the execution unit to thereby transform the encrypted application into executable data for use by the computing system. Also, the device may decrement a number of metering units stored at the device during execution of the encrypted application by the computer.

SPECIFICATION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Many prior-art high-value computers, personal digital assistants, organizers, and the like, are not suitable for use in a pre-pay or pay-for-use business model as is. The ability to enforce a contract requires a service provider, or other enforcement entity, to be able to affect a device's operation even though the device may not be connected to the service provider, e.g. connected to the Internet. A first stage of enforcement may include a simple pop up warning, indicating the terms of the contract are nearing a critical point. A second stage of enforcement, for example, after pay-per-use minutes have expired or a subscription period has lapsed, may be to present a system modal user interface for adding value and restoring service. A provider's ultimate leverage for enforcing the terms of a subscription or pay-as-you go agreement is to disable the device. Such a dramatic step may be appropriate when it appears that the user has made a deliberate attempt to subvert the metering or other security systems active in the device.

Uses for the ability to place an electronic device into a limited function mode may extend beyond subscription and pay-per-use applications. For example, techniques for capacity consumption could be used for licensing enforcement of an operating system or individual applications.

Figure 1:
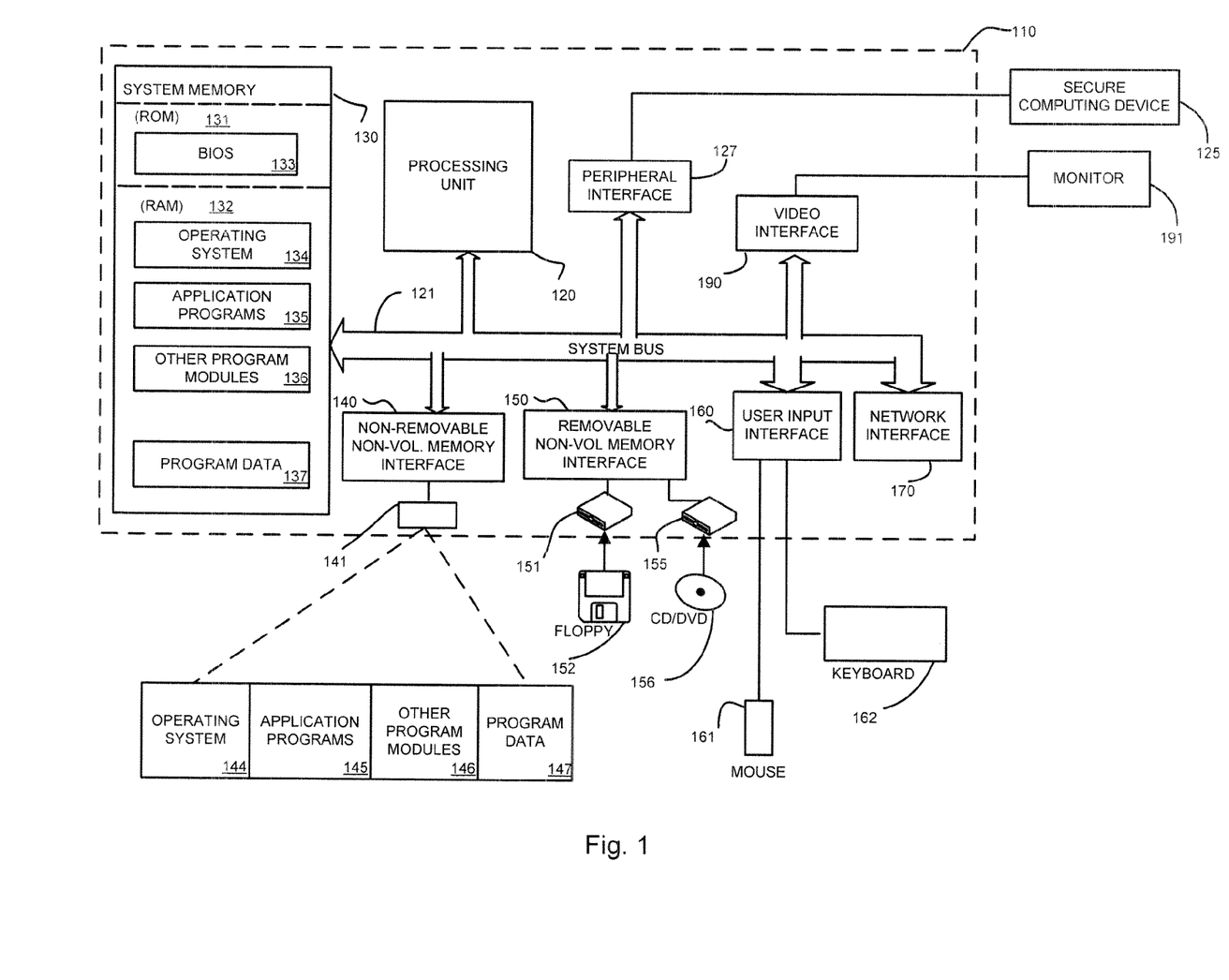
FIG. 1 is an illustration of a computer that implements a method or includes an apparatus for using USB flash devices and other portable storage as a means to access prepaid computing.

FIG. 1 illustrates a logical view of a computing device in the form of a computer 110 that may be used in a pay-per-use or subscription mode. For the sake of illustration, the computer 110 is used to illustrate the principles of the instant disclosure. However, such principles apply equally to other electronic devices, including, but not limited to, diskless computing devices, cellular telephones, personal digital assistants, media players, appliances, gaining systems, entertainment systems, set top boxes, and automotive dashboard electronics, to name a few. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, front side bus, and Hypertransport™ bus, a variable width bus using a packet data protocol.

The computer 110 may include a secure computing device 125. The device 125 may be enabled to provide an operating system, perform security monitoring, pay-per-use and subscription usage management, and policy enforcement related to term-s and conditions associated with paid use, particularly in a subsidized purchase business model. The device 125 may include other components as described in relation to FIG. 2. The device 125 may communicate with the computer 110 through an interface 127. In one embodiment, the interface 127 that allows the device 125 to communicate with the computer 110 is a port communicating with a universal serial bus (USB) of the computer 110.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132 A basic input/output system 133 (BIOS), containing the basic routines that help to transfer Information between elements within computer 110, such as during start-up, is typically stored in ROM 131. In one embodiment, the BIOS is configured to transfer information from the secure computing device 125 or any other external memory device upon start-up. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, digital camera, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190.

The computer 110 may operate in a networked environment using logical connections to one or more remote computers (not depicted) over a network interface 170, such as broadband Ethernet connection or other known network.

Figure 2:
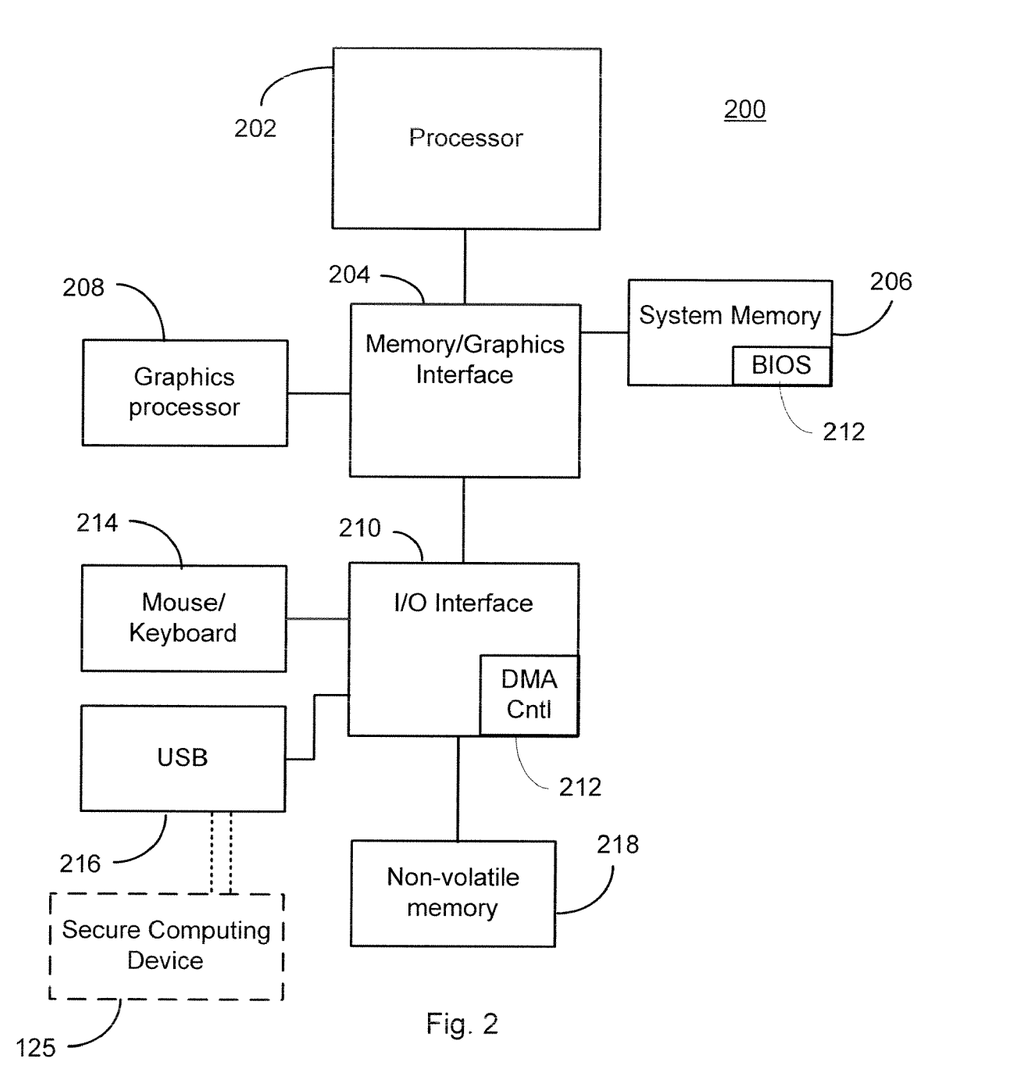
FIG. 2 is a simplified and exemplary block diagram of a system supporting a pay-per-use and subscription business model.

FIG. 2 is an architectural diagram of a computer 200, the same as or similar to the computer 110 of FIG. 1. The architecture of the computer 200 may be typical of general-purpose computers widely sold and in current use. A processor 202 may be coupled to a graphics and memory interface 204. The graphics and memory interface 204 may be a "Northbridge" controller or its functional replacement, such as a "Graphics and AGP Memory Controller Hub" (GMCH). The graphics and memory interface 204 may be coupled to the processor 202 via a high speed data bus, such as the "Front Side Bus" (FSB), known in computer architectures. The processor 202 may also be connected, either directly or through the graphics and memory interface 204, to an input/output interface 210 (I/O interface). The I/O interface 210 may be coupled to a variety of devices represented by, but not limited to, the components discussed below. The I/O interface 210 may be a "Southbridge" chip or a functionally similar circuit, such as an "I/O Controller Hub" (ICH). Several vendors produce Northbridge and Southbridge circuits and their functional equivalents, including the Intel Corporation of Santa Clara, Calif. The I/O interface 210 may include a direct memory access (DMA) controller 212. The DMA controller 212, in conjunction with the I/O controller may allow memory to be accessed with the intervention or involvement of the processor 212.

A variety of functional circuits that incorporate functions related to those described in FIG. 1 may be coupled to either the graphics and memory interface 204 or the I/O Interface 210. The graphics and memory interface 204 may be coupled to system memory 206 and a graphics processor 208, which may itself be connected to a display (not depicted). A mouse/keyboard 214 may be coupled to the I/O interface 210. A universal serial bus (USB) 216 may be used to interface external peripherals including flash memory, cameras, network adapters, etc. (not depicted). In one embodiment, a USB 216 interfaces a secure computing device 125 with the computer 110. The secure computing device 125 may also have a direct connection to the DMA controller 212. Alternate embodiments may have a device 125 coupled directly to the graphics and memory interface 204 instead of the I/O interface 210. In still other embodiments, the device 125 may be coupled directly to the processor 202, but access to the memory 206 or DMA controller without processor intervention, while not essential, may increase the security of the application. Nonvolatile memory 218, such as a hard disk drive or any of the other non-volatile memories listed above, may also be coupled to the I/O interface 210. Of course, other alternatives are possible.

The embodiment of FIG. 2 may have a separate BIOS storage area 220. Also, another BIOS, several versions of BIOS, or portions of a BIOS may be stored in the secure computing device 125, as will be discussed in more detail with respect to FIG. 3. With respect to enforcement of a policy related to contractual terms of use, the device 125 may also have an ability to force a system reset at any time. A system reset function may ensure that pay-per-use or subscription terms are met, as well as provide a clean environment when starting with either a normal or a restricted operation BIOS, as is discussed below.

Figure 3:
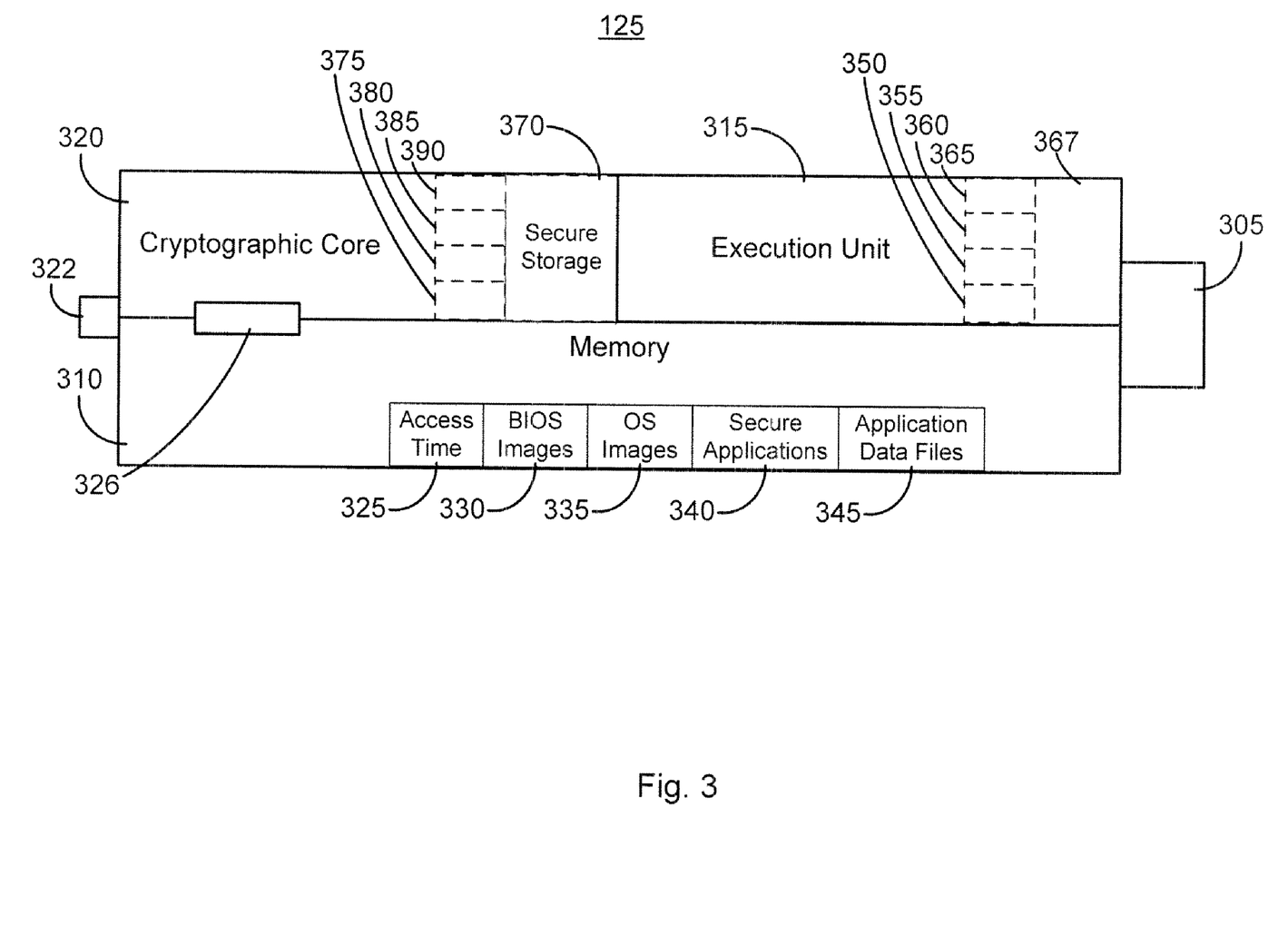
FIG. 3 is a simplified and representative block diagram of a provisioning server.

FIG. 3 is a block diagram view of a secure computing device 125. The secure computing device 125 as illustrated in FIG. 3 may be represented and arranged in a variety of forms to include the elements as described below. For example, the device 125 may include an interface 305 that may enable communication between the device 125 and the computer 110. The device 125 may communicate with the computer 110 through any combination of 1394, USB, Internet Small Computer Systems Interface, serial, parallel, infrared, Near Field Communication, BlueTooth, 802.x, or other connection. In one embodiment, the interface 305 is a male type-A USB connector that provides an interface to the host computer 110. The device 125 may include a memory area 310. In one embodiment, the memory area 310 is a single flash memory chip or multiple flash memory chips. Additionally, the device 125 may include an execution unit 315, a cryptographic core 320, and an indicator light 322. In one embodiment, the execution unit 315 and the cryptographic core 320 may be a single component of the device 125 and may be in a protected area of the device 125. For example, the cryptographic core 320 and the execution unit 315 may provide a processing and encryption subsystem of the device 125 that reaches a suitable Common Criteria Evaluation Assurance Level to ensure that the device 125 may not be compromised. In one embodiment, the cryptographic core 320 and the execution unit 315 includes a device such as the SLE series of smartcards as produced by Infineon Technologies AG of Munich, Germany. As discussed below, and whether the cryptographic core 320 and execution unit 315 may be configured as one component of the device 125 or several, either or both of the cryptographic core 320 and the execution unit 315 may comprise a combination of a processor, a secure clock, a secure memory, a random number generator, and a cryptographic accelerator chip.

The memory 310 may include a number of data items 325, 330, 335, 340, 345 that may be publicly accessed or may be encrypted and stored on the device 125 using the cryptographic core 320 or any other suitable encryption method. The data items may be used by the computer 110 during operation, as explained in more detail below. Encrypted items stored on the device 125 may be accessed by a connected computer 110 through the cryptographic core 320 or execution unit 315. Publicly stored items within the memory 310, i.e., documents, media files, or user-created files, may be accessed directly. The memory 310 may also include data indicating an access time 325. In one embodiment, the access time 325 represents a user's ability to access services of the computer 110. For example, the access time 325 may be an amount of renewable time purchased by a user that is decremented as the user access the computer 110 OS or applications. A battery 326 may also preserve data within some types of device 125 memory 310.

The memory 310 may also include a number of BIOS images 330 and OS images 335. In one embodiment, computer 110 first uses a BIOS 133 of the computer 110 that passes control to one of several BIOS images 330 stored on the device 125 during a boot sequence. For example, the BIOS 133 may enable a USB host controller before passing control to the BIOS 330 of the device 125. Also, the computer 110 may process one device 125 BIOS image over another due to usage constraints enforced by the amount of access time 325 to enable an OS or other data stored on the device 125. The memory 310 may also include a number of secure applications 340. In one embodiment, a user purchases access time 325 for a secure application 340. The purchased secure application 340 may be in a format that allows its execution from the device 125 without being installed on the computer 110. For example, the secure applications 340 may be formatted as the Softgrid® applications produced by Microsoft Corporation of Redmond, Wash. The memory 310 may also include application data files 345. In one embodiment, a user accesses the application data files 345 using the secure applications 340. The application data files may be stored publicly to allow a user to remove them from the device without enabling the cryptographic core 320. Of course, the device 125 may store many other data items. For example, the device 125 may store digital certificates, digital rights management rules, hash keys, data that is unrelated to a secure application 340, or other items.

The execution unit 315 may provide the ability to securely process data within the device 125. The execution unit 315 may include a processor 350, a secure clock 355, a random number generator, and secure memory 365. The execution unit may communicate data from the memory 310 through the cryptographic core 320, to the computer 110. Additionally, a local provisioning module 367 may manage the allocation of the access time 325 stored in the secure memory device 125. The local provisioning module may be described by U.S. patent application Ser. No. 10/988,907, and U.S. patent application Ser. No. 11/612,433 the entire disclosure of which is hereby incorporated by reference.

The cryptographic core 320 may include a number of cryptographic items stored in a secure storage area 370. In one embodiment, the secure storage area 370 includes data items related to a process for cryptographic encoding of data stored within the device 125 or accessed by the computer 110 from the device 125. For example, the secure storage 370 may include a security certificate, an encryption key, a hash, and digital signatures. In another embodiment, the secure storage area 370 may include the access time 325 as previously described. In a further embodiment, the cryptographic core 320 includes a cryptographic engine 375, a random number generator 380, a trusted clock 385, and a processor 390. In a still further embodiment, either the execution unit 315 or the cryptographic core 320 resides on the device 125 along with a secure storage 370.

Figure 4:
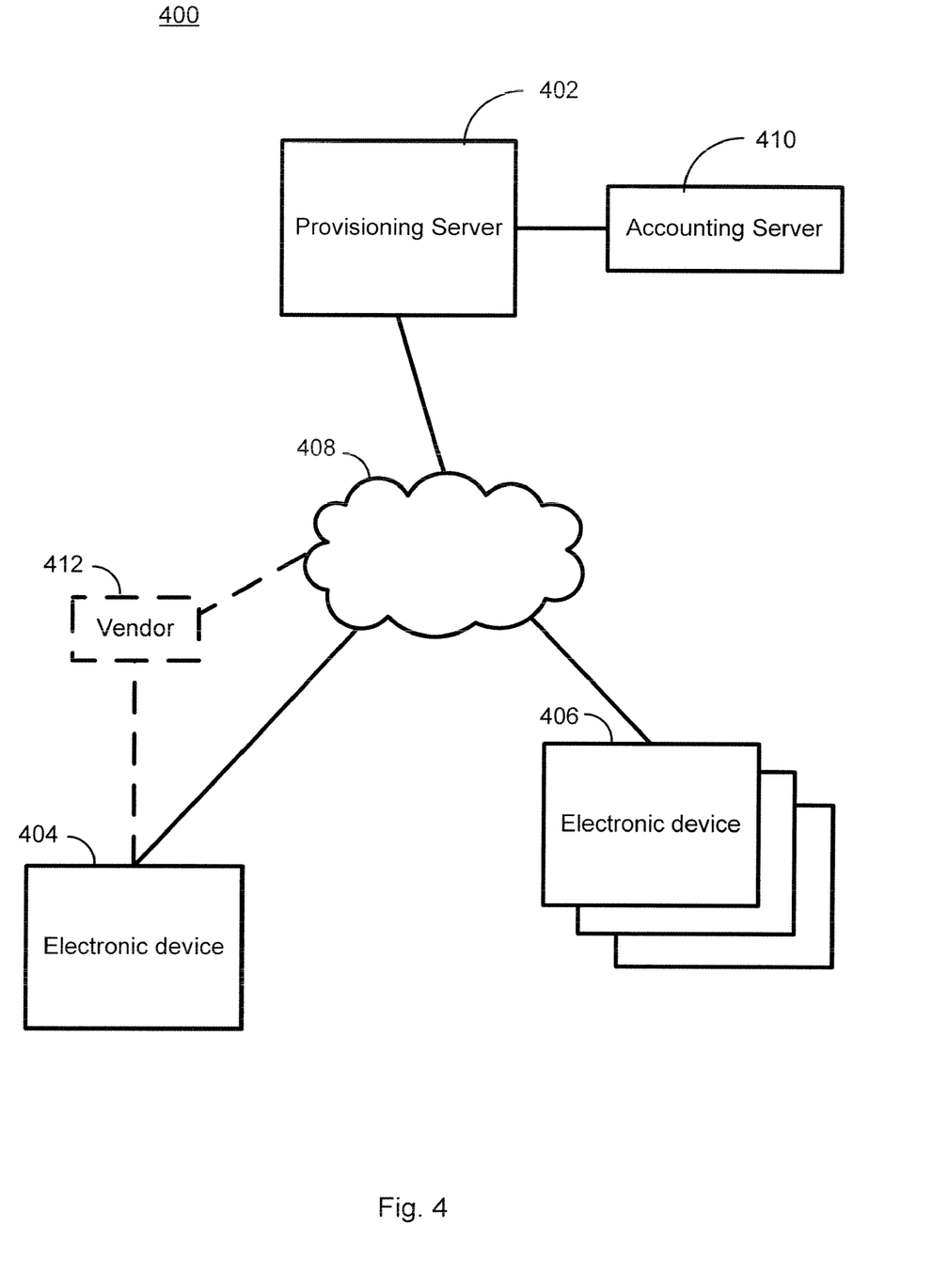
FIG. 4 is a simplified and representative block diagram of a secure memory device.

FIG. 4 is a simplified and exemplary block diagram of a system 400 supporting pay-per-use and subscription usage of a computer or other electronic device. A provisioning server 402 may serve as a trusted endpoint for provisioning requests from one or more electronic devices participating in the pay-per-use business ecosystem. One electronic device 404 may be similar to the secure computing device of FIG. 1. Other electronic devices 406 may perform substantially the same as the exemplary device 404. Communication between the provisioning server 402 and the electronic device 404 may be accomplished through a network 408 that may include landline, wireless, or broadband networks, or other networks known in the art.

An accounting server 410 may be linked to the provisioning server 402 and may maintain account data corresponding to the electronic device 404. Account data may also be stored at the device 404. The accounting server 410 may also serve as a clearinghouse for financial transactions related to the electronic device 404, such as, replenishing or adding value to a pay-per-use account maintained on the accounting server 410 and recorded at the device 404. In one embodiment, the device 404 establishes a connection with a vendor 412 that communicates with the accounting server 410. In another embodiment, the device 404 establishes a connection directly with the accounting server 410. The vendor may be a vending machine or other stand-alone, self-service, point-of-sale kiosk. A user may plug the device 404 into the vendor 412, select a service for loading to the device, pay, and receive the service. The service may be any value, access time 325, a secure application 340, or some other data that may be recorded at the accounting server 410 and stored at the device 404 for use with a computer 110. In one embodiment, a user plugs the device 404 into a vendor 412 or other device 404, 406 and loads an application to which the user desires access or other pay-per-use services.

In one embodiment, the user purchases an amount of time to use a computer OS, applications, or both. In another embodiment, the user purchases the ability to use a word processing or other application for a number of uses, a number of completed pages, or any other measurable use. As previously discussed, the applications the user may purchase using the system 400 may be stored in an encrypted form on the device 404 and decrypted by the cryptographic core 320. Once the user depletes the purchased usage for the application, it may delete itself from the device 404. In one embodiment, applications loaded to the device 404 are in a Softgrid® format. A user may transfer his or her access to a computer 110 in a pay-for-use system to any computer 110 configured to access the device 125. In one embodiment, the user transports his or her usage time to a computer 110 in an internet cafe. Other prepaid account funds transfer systems are well known, for example, with respect to prepaid cellular phones or other mobile computing systems, and are equally applicable in this business model.

Figure 5:
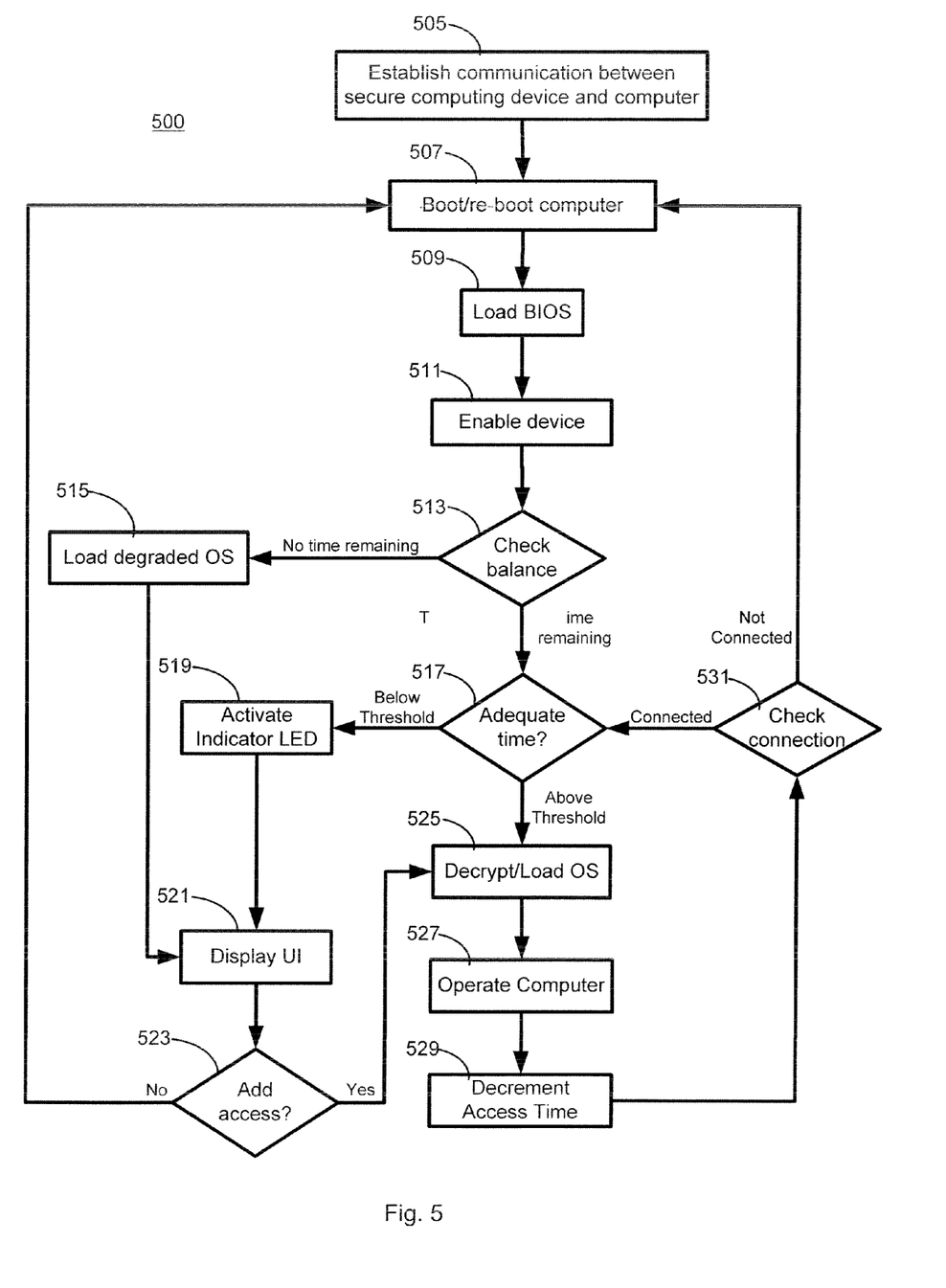
FIG. 5 is an illustration of a method for using USB flash devices and other portable storage as a means to access prepaid computing.

FIG. 5 is a simplified and exemplary representation of a method 500 of using a secure computing device 125 with a computer 110 in a pay-as-you-go scenario. At step 505, a secure computing device 125 may establish communication with a computer 110. In one embodiment, a user plugs the interface 305 into a computer 110 USB port. At block 507, if the computer is off, the user may power on the computer 100. If the computer is on when the user inserts the secure computing device 125, the computer 110 may reboot. In one embodiment, if the computer 110 is on when the device 125 establishes communication, a method executes on the device 125 to pull a reset line of the computer 110. Of course, other manners of recognizing the secure computing device 125 are possible.

At block 509, upon power up, reboot or recognition, the computer 110 may load a BIOS image 330. For example, the computer 110 may be enabled to seek a BIOS image 330 from the connected device 125. At block 511, the device 125 may be enabled. In one embodiment, a Southbridge of the computer 110 enables the device 125 while activating the busses of the computer 110. For example, one bus may be a USB that communicates with the device 125.

At block 513, a processor 350 of the device 125 may check the access time 325 to determine if the computer 110 may load any of the stored operating systems 335, applications 340, or other metered data of the device 125. In one embodiment, communication between components within the device 125 conforms to the Institute of Electrical and Electronics Engineers (IEEE) 1667 Standard Protocol for Authentication in Host Attachments of Transient Storage Devices. In another embodiment, another suitable communication protocol is used. At block 515, if no access time 325 remains, the device 125 may load a degraded OS. In one embodiment, a degraded OS limits the ability of a user to access the computer 110. For example, a degraded OS may only allow a user to retrieve saved documents and other user-created application files stored on the device 125 or may permit limited network connectivity to purchase additional access time 325.

At block 517, if access time 325 remains, the device 125 may determine if the remaining access time 325 is above or below a threshold. If the amount of access time 325 is below a threshold, the device 125 may, at block 519, activate an indicator LED 322 or otherwise notify a user of an insufficient balance of access time 325 remaining on the device 125. In one embodiment, a processor may activate an indicator LED 322 of the device 125 upon discovering an inadequate access time 325. Several indicator LEDs 322 may convey different notifications to the user, for example, a notification of a low time or other usage balance or a notification of a full or adequate balance. The indicator LED 322 may also include a video screen that conveys a numerical balance of access time remaining on the device 125 or any other information related to any data stored on the device 125 such as a title, a size, a purchase date, or a number of accesses or other uses remaining.

At block 521, whether no time remains on the device 125 and it loads a degraded OS at block 515 or the device 125 determines that an available amount of access time 325 is below a threshold at block 517, the device may display a user interface (UI). In one embodiment, the UI permits a user to purchase additional access time over a network 408. In a further embodiment, the UI instructs the user to purchase additional access time 325 at a vendor 412 or other means to connect the device 125 to the provisioning server 402 and accounting server 410.

If, at block 517, the amount of access time 325 remaining is above a threshold, or, through the UI of block 521, the user adds an amount of access time 325 for an operating system 335 or application 340, the device 125 may, at block 525, load an OS 335 or application 340 to the computer 110. The device 125 may include several types of operating systems 335 or applications 340 that may be loaded to the computer. For example, the device may include a Unix-based operating system, an OS as produced by the Apple, Inc. of Cupertino, Calif., Linux, DOS, or a Windows® operating system as well as compatible applications for each OS. The device 125 may present a user with the option of loading any operating system 335 or application 340 from the device 125 that includes a valid access time 325 balance. In one embodiment, to load any of the OS images 335, secure applications 340, or other metered files, the device 125 decrypts the file with the cryptographic core 320 residing in a protected area of the device 125 before presenting the file to the computer 110 for execution or processing. In a further embodiment, as previously discussed in relation to the memory 310, any encrypted OS 336, application 340, or other file that is decrypted by the cryptographic core 320 is not installed on the computer 110, but is executed from the device 125. In a still further embodiment, OS images 335, secure applications 340, or other files are accessed from public storage 310.

At block 527, the user may operate the computer 110 using the loaded OS 335 and applications 340. In one embodiment, both the OS 335 and the applications 340 are metered. For example, the user may use an OS 335 and applications 340 according to an amount of access time 325 purchased from and sent by the provisioning server 402. The secure computing device 125 may save the access time 325 to its secure memory 370 and consume or decrement the purchased access time 325 from the memory 370 as the OS 335 or applications 240 execute on the computer 110.

At block 529, the device 125 may decrement an amount of access time 325 from the device 325 according to the time used. In one embodiment, a user's access to an OS 335, application 340, or other metered file is measured in an amount of time that decreases during use. In another embodiment, a user's access to metered files of the device 125 is measured by use, for example, a number of times the user accesses the application, a number of pages a user completes in a secure word processing application, or any other measurable use of the OS 335 or an application 340.

At block 531, the OS 335 loaded at step 515 may periodically check whether the device 125 is connected to the computer. If the device 125 becomes disconnected from the computer 110, the OS 335 loaded at step 525 may return to block 507 to reboot the computer 110. If the OS 335 determines that the device 125 is connected to the computer 110, then the method may return to block 517 to determine if an adequate amount of access time 325 remains on the device 125.

Many modifications and variations may be made in the techniques and structures described and illustrated herein without departing from the spirit and scope of the present invention. Accordingly, it should be understood that the methods and apparatus described herein are illustrative only and are not limiting upon the scope of the invention.

The invention claimed is:

1. A removable peripheral apparatus for enabling a subscription-based computing system comprising:
   an execution unit including a processor;
   a private memory including an encrypted application;
   a computing system interface; and
   a cryptographic unit including a secure storage, the secure storage including a number of metering units and a non-transitory computer-readable medium having computer-executable instructions comprising:
      a communication module for routing messages and data from the execution unit through the computing system interface to the computing system;
      a decryption module for routing data related to the encrypted application through the cryptographic unit to the execution unit to thereby transform the encrypted application into executable data for use by the computing system; and
      a metering module for decrementing the number of metering units during execution of the encrypted application by the computing system;
   wherein if the metering module decrements the number of metering units to a number below a threshold, the execution unit activates an indicator.

2. The apparatus of claim 1, wherein the encrypted application is at least one of an operating system, a basic input/output system, a software application dependent upon the operating system, and a data file associated with the software application.

3. The apparatus of claim 1, wherein the secure storage includes at least one of firmware, security certificates associated with the encrypted application, encryption keys, and a trusted clock.

4. The apparatus of claim 1, further comprising a public non-volatile memory capable of storing at least one of an unencrypted application, a data file associated with the unencrypted application, and a data file associated with the encrypted application.

5. The apparatus of claim 1, wherein the computing system interface includes a male type-A USB connector.

6. A system including a secure computing device in communication with a computer, the secure computing device including a protected processor for executing computer executable code, a secure memory for storing metered access time, and computer executable code, a cryptographic core and an input/output circuit, the protected processor physically configured to execute computer executable code for:
- determining if the metered access time is below a threshold;
- communicating an encrypted application from the secure memory to the cryptographic core;
- decrypting the encrypted application at the cryptographic core;
- communicating the decrypted application to the computer through the input/output circuit;
- executing the decrypted application on the computer;
- decrementing the metered access time while the decrypted application executes on the computer; and
- activating an indicator light of the secure computing device if the metered access time is below a threshold.

7. The system of claim 6, further comprising a server in communication with the secure computing device and the computer, the server communicating an amount of metered access time to the secure computing device if the amount of metered access time is below a threshold.

8. The system of claim 6, wherein the input/output circuit is in communication with a male type-A USB connector.

9. The system of claim 6 wherein the secure memory includes at least one of read-only memory and flash memory.

10. The system of claim 6, wherein the secure computing device includes a smartcard.

11. The system of claim 6, wherein the encrypted application is at least one of an operating system, a basic input/output system, a software application dependent upon the operating system, a Softgrid® application, and a data file associated with the software application.

12. The system of claim 6, wherein the secure memory includes at least one of firmware, security certificates associated with the encrypted application, encryption keys, and a trusted clock.

13. The system of claim 6, wherein secure computing device comprises a universal serial bus flash device.

14. The system of claim 6, further comprising computer executable code for loading a degraded operating system if the metered access time is below a threshold.

15. A method for enabling a metered computing environment comprising:
- determining an amount of access data stored on a secure computing device, the secure computing device including a secure memory including an encrypted application, a cryptographic core, and a computing system interface;
- decrypting the encrypted application at the cryptographic core;
- executing the decrypted application at a computer through the computing system interface;
- decrementing an amount of access data from the secure computing device while the decrypted application is executing at the computer;
- saving the decremented amount of access data to the secure memory; and
- loading a degraded operating system if the amount of access data stored on the secure computing device is below a threshold level.

16. The method of claim 15, further comprising displaying a user interface if the amount of access data stored on the secure computing device is below a threshold level;
- communicating an additional amount of access data through the user interface.

17. The method of claim 15, wherein the access data comprises at least one of an amount of time, a number of uses, a number of pages associated with the decrypted application, a number of actions associated with the decrypted application, or a decrypted application file size.

* * * * *